United States Patent [19]

Teraura

[11] Patent Number: 4,513,680
[45] Date of Patent: Apr. 30, 1985

[54] BOAT STEERING MECHANISM

[75] Inventor: Makoto Teraura, Takarazuka, Japan

[73] Assignee: Nippon Cable System, Inc., Takarazuka, Japan

[21] Appl. No.: 440,332

[22] Filed: Nov. 9, 1982

[30] Foreign Application Priority Data

Jul. 9, 1982 [JP] Japan .................. 57-120125

[51] Int. Cl.³ ............................................. B63H 25/10
[52] U.S. Cl. ........................ 114/159; 114/144 R; 74/480 B; 74/498
[58] Field of Search ............ 74/498, 480 B, 484 R, 74/501 R, 501 P; 114/144 R, 159, 156, 154, 160, 161; 156/143

[56] References Cited

U.S. PATENT DOCUMENTS

| | | | |
|---|---|---|---|
| 2,601,791 | 7/1952 | Morse | 114/144 R |
| 2,767,596 | 10/1956 | Simon et al. | 74/480 B |
| 3,063,303 | 11/1962 | Cadwallader | 74/480 B |
| 3,110,193 | 11/1963 | Bratz | 74/480 B |
| 3,208,300 | 9/1965 | Morse | 114/144 R |
| 4,099,425 | 7/1978 | Moore | 156/143 |
| 4,362,069 | 12/1982 | Giatras | 74/501 P |

FOREIGN PATENT DOCUMENTS

| | | | |
|---|---|---|---|
| 586248 | 3/1925 | France | 74/501 |
| 705487 | 5/1966 | Italy | 114/144 R |

Primary Examiner—Trygve M. Blix
Assistant Examiner—Stephen P. Avila
Attorney, Agent, or Firm—Armstrong, Nikaido, Marmelstein & Kubovcik

[57] ABSTRACT

A boat steering mechanism for permitting a remotely mounted rudder control by means of a push-pull control cable, comprising a rack being formed with a groove for inserting an inner cable, a projection projecting from the center or its vicinity of a rack casing into which the rack is slidably inserted, an inclined hole for slidably inserting the inner cable, perforated through the projection into the groove, a triangular guide portion having an inclined plane which continues from the lower end of the inclined hole and projecting from the inner wall of the rack casing into the groove so as to be inserted into the groove and a fitting member for fastening on one end of the inner cable, secured to the rack at one end of the groove, whereby the push-pull control cable can be provided with a large curvature and the sliding resistance of the whole mechanism can be decreased.

3 Claims, 8 Drawing Figures

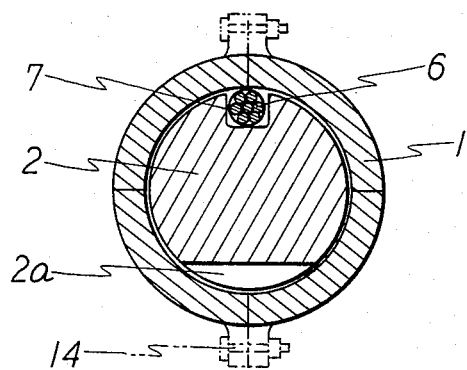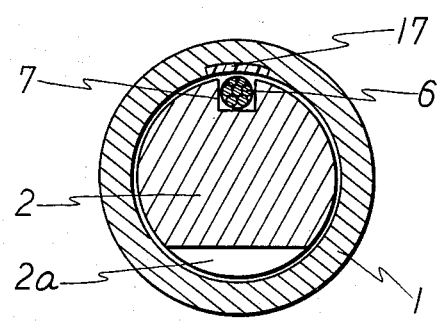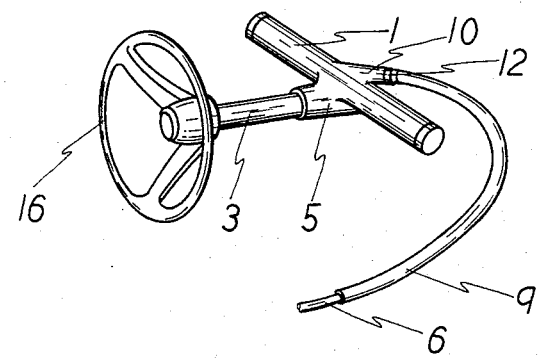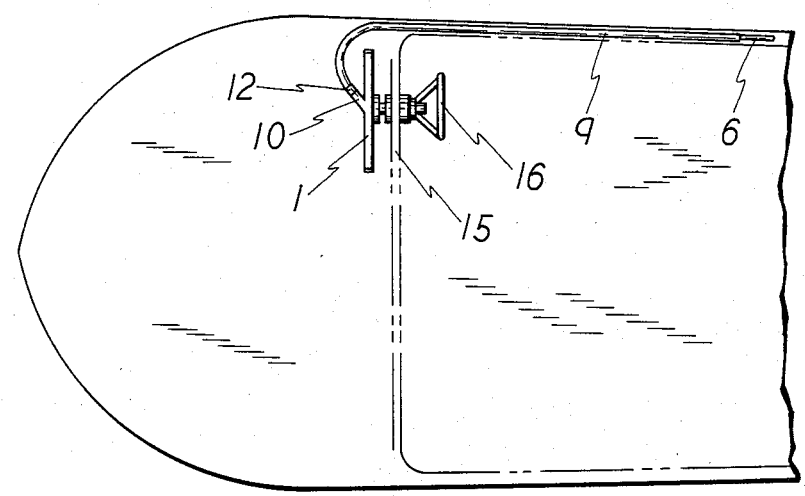

BOAT STEERING MECHANISM

BACKGROUND OF THE INVENTION

The present invention relates to a novel boat steering mechanism, and more particularly to a boat steering mechanism in which a push-pull control cable is led out of the center or its vicinity, in the longitudinal direction, of a rack and cable assembly, whereby the push-pull control cable can be provided with a large curvature, and which has a simple structure.

Hitherto, there is on the market a boat steering mechanism which can control a remotely mounted rudder by means of a push-pull control cable, which is suggested by U.S. Pat. No. 3,208,300. As shown in FIGS. 5 to 7, the steering mechanism comprises a pinion 22 secured to a steering wheel shaft 21, a rack 23, the teeth of which mesh with teeth of the pinion 22, an inner cable 24 of the push-pull control cable which is connected to one end of the rack 23 and a rack cartridge 25 for slidably guiding and receiving the rack 23. The steering mechanism translates the rotative motion of a steering wheel 26 into the linear motion of the inner cable 24 of the push-pull control cable by means of the pinion 22 and the rack 23, whereby the steering mechanism can control a remotely mounted rudder.

In the above-mentioned boat steering mechanism, the inner cable 24 is slidably pushed and pulled in an outer casing 27 by the application of either tensile or compressive forces. The inner cable 24 must be guided so as to not bend in the rack cartridge 25 by the compressive force. Therefore, as shown in FIG. 7, it requires that a rod 28, which does not need a guide member even in the application of compressive forces, is connected to one end of the inner cable 24. Also, it requires that a guide pipe 29 for guiding the inner cable 24 extended from the outer casing 27 is extended from the inside of the outer casing 27 of the rack cartridge 25. The boat steering mechanism of the above-mentioned construction has a disadvantage that a complicated construction is necessitated because of requiring the rod 28 and the guide pipe 29, and because of the telescoping arrangement of the rod 28, the guide pipe 29 and the rack 23. Also, the boat steering mechanism has another disadvantage that large resistance is generated between the rack 23 and the guide pipe 29 and between the rod 28 and the guide pipe 29 due to sliding friction. Also, the boat steering mechanism has the other disadvantage that since a member 30 for fixing the outer casing 27 of the control cable is fastened to one end of the rack cartridge 25, the length of the rack cartridge 25 becomes longer in a longitudinal direction. When using the boat steering mechanism in the narrow space of a boat, the curvature of the curved portion in the push-pull control cable has a small radius as shown in FIG. 6. Therefore, the boat steering mechanism has the further disadvantage that the sliding resistance of the inner cable becomes larger.

OBJECT OF THE INVENTION

An object of the present invention is to provide a boat steering mechanism in which a push-pull control cable is led out of the center or its vicinity, in the longitudinal direction, of a rack and cable assembly, whereby the push-pull control cable can be provided with a large curvature.

Another object of the invention is to provide a boat steering mechanism which has a small sliding resistance of an inner cable and has a high transfer efficiency of operating force.

Another object of the invention is to provide a boat steering mechanism which is constructionally uncomplicated and inexpensive to manufacture.

Other objects and advantages of the invention will become apparent from the following description with reference to the accompanying drawings.

BRIEF DESCRIPTION OF THE DRAWINGS

FIG. 2a is a sectional view taken along line X—X of FIG. 1;

FIG. 2b is a sectional view for showing another embodiment of the boat steering mechanism of the invention;

FIG. 3 is a perspective view of the boat steering mechanism of FIG. 2;

FIG. 4 is a schematic plan view of a boat employing the boat steering mechanism of FIG. 3;

DETAILED EXPLANATION OF THE INVENTION

Figure 1:
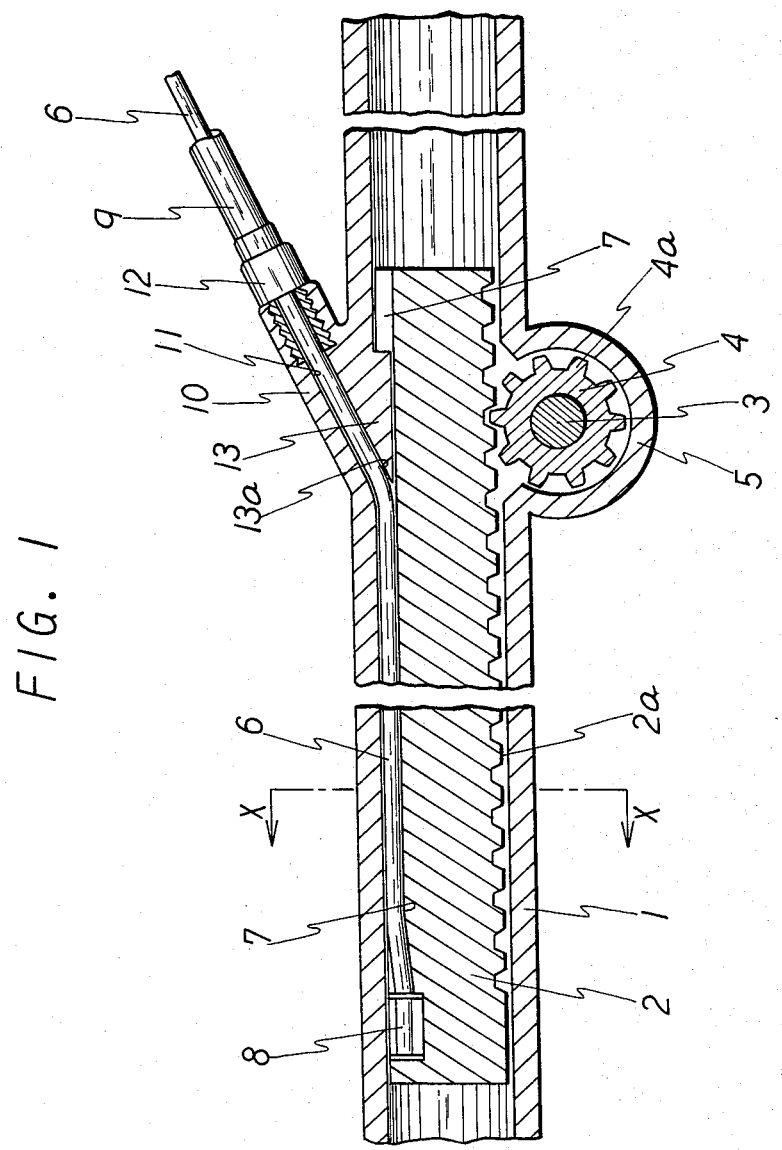
FIG. 1 is a longitudinal sectional view for showing an embodiment of an improved boat steering mechanism of the present invention.
Figure 5:
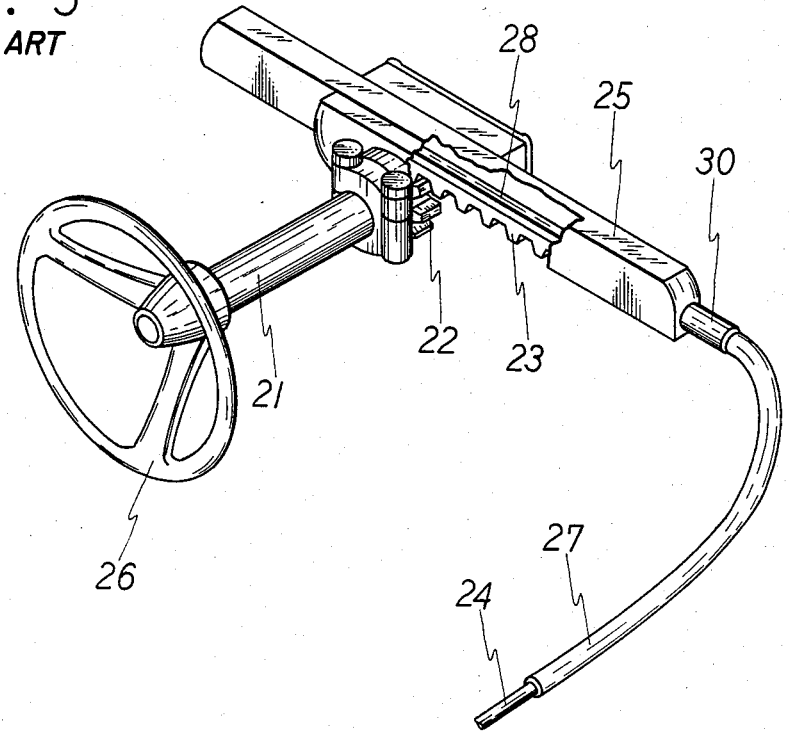
FIG. 5 is a partially cutaway perspective view of a conventional boat steering mechanism.
Figure 6:
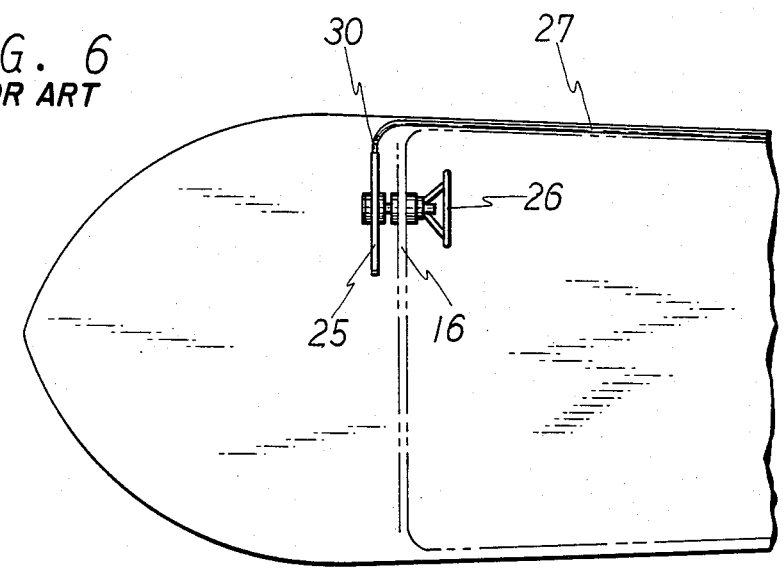
FIG. 6 is a schematic plan view of a boat employing the conventional boat steering mechanism of FIG. 5.

In FIGS. 1 to 2a, a rack 2 is slidably inserted into a rack casing 1. The rack 2 is provided with a series of teeth 2a in a longitudinal direction thereof. A pinion 4 is securely attached to a steering shaft 3. Teeth 4a of the pinion 4 are engaged and meshed with the teeth 2a of the rack 2. The pinion 4 is disposed in a pinion casing 5 which is formed with the rack casing 1 as one body. The rack 2 is formed with a groove 7 for inserting an inner cable 6 of a control cable on the side opposite to the teeth 2a of rack 2. A fitting member 8 for fastening one end of the inner cable 6 of the control cable is secured to the rack 2 at one end of the groove 7. A projection 10 for fastening one end of an outer casing 9 of the control cable is projected from the center or its vicinity of the rack casing 1 with a slight gradient as to the longitudinal direction of the rack casing 1. The projection 10 has an inclined hole 11 for slidably inserting the inner cable 6. A tension adjusting member 12 for adjusting the length of the outer casing 9 is screwed on the top end of the projection 10. One end of the outer casing 9 is connected with the projection 10 by means of the tension adjusting member 12. The other end of the outer casing 9 is connected with a control unit of a rudder. The inner cable 6 is slidably pushed and pulled in the outer casing 9. As shown in FIG. 1, a triangular guide portion 13 is projected into the groove 7 from the inner wall of the rack casing 1 at the lower end portion of the inclined hole 11 so as to efficiently guide the inner cable 6. The triangular guide portion 13 has an inclined plane 13a which continues smoothly from the inclined hole 11. In order to more easily guide the inner cable 6, a concave groove may be formed in the inclined plane 13a. When the rack 2 slides so as to push the inner cable 6 out of the groove 7 thereof, the inclined plane 13a of the triangular guide portion 13 smoothly guides the inner cable 6 into the inclined hole 11, whereby the inclined plane 13a of the triangular guide portion 13 prevents the inner cable 6 from bending or buckling.

In a boat steering mechanism of the invention, since the rack 2, the pinion 4, the inner cable 6 and the fitting member 8 are provided in the rack casing 1, it is desired to provide a flange 14 shown in an imaginary line of FIG. 2b in the rack casing 1 in order to easily assemble the boat steering mechanism.

In the case of the above-mentioned embodiment, the projection 10 of the rack casing 1 and the groove 7 of the rack 2 are provided on the side opposite to the teeth 2a of the rack 2 and the teeth 4a of the pinion 4, i.e. on the top side of FIG. 1 and FIG. 2. However, the arrangement of the projection 10 and the groove 7 is not particularly limited. The arrangement of the projection 10 and the groove 7 can be optionally selected depending on the condition of fitting a steering wheel mechanism to a dashboard 15 shown in FIG. 4.

Hereinafter, the functions and advantages of a boat steering mechanism of the invention will be explained.

In FIGS. 3 to 4, when a steering wheel 16 which is fitted to the steering shaft 3 is turned in either direction, the rack 2 slides in the rack casing 1 in a longitudinal direction thereof by means of the pinion 4. At that time, the inner cable 6 one end of which is secured to the rack 2 is pushed from the groove 7 toward a control unit of a rudder or the inner cable 6 is pulled into the groove 7 through the inclined plane 13a and the inclined hole 11, whereby the rudder can be operated or controlled.

In the boat steering mechanism of the invention, as shown in FIGS. 3 to 4, since the push-pull control cable is led out of the center or its vicinity of a rack and cable assembly, the longitudinal length of the rack casing 1 can be shortened. The words "rack and cable assembly" means a mechanism comprising the rack casing 1, the rack 2, the pinion 4 and one end portion of the inner cable 6. Furthermore, since the push-pull control cable is provided with a large curvature, the inner cable 6 is smoothly, efficiently pushed and pulled in the outer casing 9.

Figure 7:
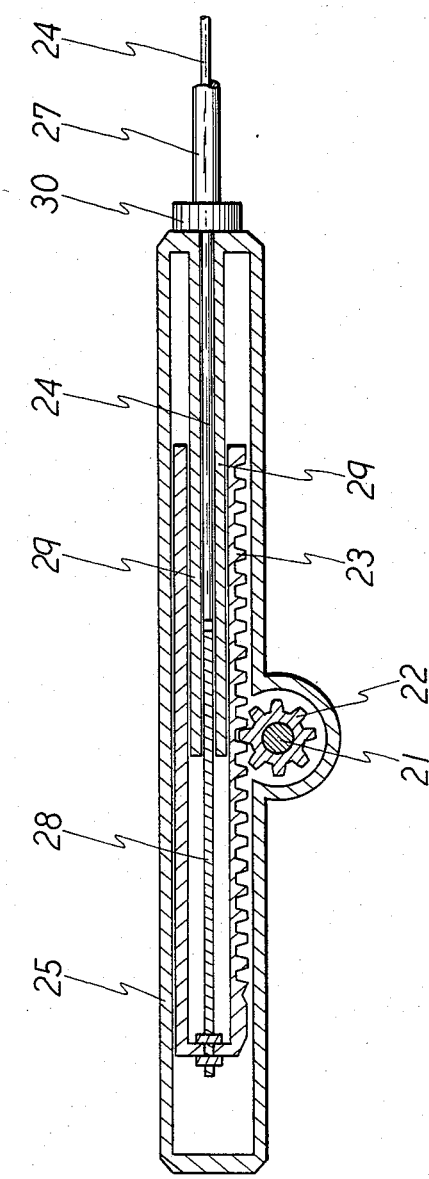
FIG. 7 is a longitudinal sectional view for showing the boat steering mechanism of FIG. 5.

Also, in the boat steering mechanism of the invention, since the inner cable 6 extended from the outer casing 9 is guided through the inclined hole 11 and the inclined plane 13a by a cylindrical space which is composed of the groove 7 and an inner wall of the rack casing 1, one end of the inner cable 6 can be directly secured to the rack 2. The rod 28 and the guide pipe 29, which the conventional boat steering mechanism needs as shown in FIG. 7, are not required. Futhermore, since the rod 28 and the guide pipe 29 are not required, the boat steering mechanism of the invention is constructionally uncomplicated and inexpensive to manufacture. In the boat steering mechanism, there is only the linear contact of the top portion of the inner cable 6 and the inner wall of the rack casing 1 with the exception of the slidable contact of the rack 2 and the inner wall of the rack casing 1. Accordingly, since the boat steering mechanism of the invention has little abrasion of the inner cable 6 depending upon the use thereof and has a small sliding resistance of the inner cable 6, the boat steering mechanism of the invention has an advantage of having a high transfer efficiency of the operating force.

In the boat steering mechanism of the present invention, it is desirable to provide a resinous slider 17 as shown in FIG. 2b so as to decrease the sliding resistance.

What is claimed is:

1. A boat steering mechanism for controling a remotely mounted rudder by means of a push-pull control cable having an outer cable casing and an inner cable which is slidably pushed and pulled in said outer cable casing, comprising:

a linear rack casing, said rack casing being formed with a pinion casing therein, and having a projection extending from the center thereof or its vicinity with a slight gradient as to the longitudinal direction of said rack casing;

a linear rack slidably received in said rack casing and provided with a series of teeth along a longitudinal side thereof, said rack being formed with a longitudinal groove therein for receiving said inner cable, and having a fitting member at one end of said groove for fastening one end of said inner cable to said rack;

a pinion disposed in said pinion casing and having teeth engaged and meshed with said teeth of said rack, said pinion being adapted to be attached to a steering shaft;

said projection on said linear rack casing having an inclined hole therethrough for slidably receiving said inner cable, said projection being formed with a triangular guide portion on its inner surface forming an inclined plane, said triangular guide portion projecting into said longitudinal groove in said rack, said inclined plane continuing smoothly from said inclined hole and having a concave groove therein for receiving said inner cable; and means for connecting one end of said outer cable casing with said projection at the opening of said inclined hole;

whereby rotation of said pinion by said steering shaft will impart translatory sliding motion to said linear rack within said rack casing and exert push-pull forces on said inner cable positioned in said groove, and said inclined triangular guide portion projecting into said groove will smoothly guide said inner cable from said groove into said inclined hole when said inner cable is pushed.

2. The boat steering mechanism of claim 1, wherein said member for fastening one end of said outer casing is a tension adjusting member for adjusting a length of said outer casing.

3. The boat steering mechanism of claim 1, wherein said rack casing is provided with a resinous slider on the portion which comes in slidable contact with said inner cable.

* * * * *